US009065912B2

United States Patent
Kewin et al.

(10) Patent No.: US 9,065,912 B2
(45) Date of Patent: Jun. 23, 2015

(54) CONVEYING TEXTUAL CONTENT FROM INTERACTIVE SYSTEMS TO IP CLIENTS

(75) Inventors: William M. Kewin, Rowlett, TX (US); Philip Ashley, Murphy, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 1982 days.

(21) Appl. No.: 12/000,597

(22) Filed: Dec. 14, 2007

(65) Prior Publication Data

US 2009/0154678 A1 Jun. 18, 2009

(51) Int. Cl.
*H04M 3/42* (2006.01)
*H04M 3/493* (2006.01)
*H04L 29/06* (2006.01)
*H04M 3/51* (2006.01)
*H04M 7/00* (2006.01)

(52) U.S. Cl.
CPC ............ *H04M 3/493* (2013.01); *H04L 65/105* (2013.01); *H04M 3/5166* (2013.01); *H04L 65/1016* (2013.01); *H04L 65/1006* (2013.01); *H04L 65/1069* (2013.01); *H04M 7/006* (2013.01); *H04M 2201/38* (2013.01)

(58) Field of Classification Search
CPC ............ H04M 3/493; H04M 2201/40; H04M 3/5166; H04M 2203/254; H04M 3/4936; H04M 3/4938; H04M 3/5183; H04M 7/006; H04M 3/42; H04M 2201/38; H04M 2201/42; H04L 65/1003–65/1096; H04L 29/06027; H04L 65/1016; H04L 65/40; H04L 67/02; H04L 65/4084; H04L 2209/56
USPC ............ 370/352–356; 379/88.17, 88.18, 379/201.02, 201.03, 265.09
See application file for complete search history.

(56) References Cited

U.S. PATENT DOCUMENTS

| | | | |
|---|---|---|---|
| 6,920,425 B1* | 7/2005 | Will et al. ....................... 704/275 |
| 7,492,883 B2* | 2/2009 | Kumhyr ..................... 379/201.04 |
| 7,634,067 B1* | 12/2009 | Velarde et al. .............. 379/88.17 |
| 7,831,246 B1* | 11/2010 | Smith et al. ..................... 455/420 |
| 2003/0074198 A1* | 4/2003 | Sussman ...................... 704/270.1 |
| 2005/0025127 A1* | 2/2005 | Strathmeyer .................. 370/352 |
| 2005/0047559 A1* | 3/2005 | Colson et al. .............. 379/88.18 |
| 2006/0098624 A1* | 5/2006 | Morgan et al. ................ 370/352 |
| 2006/0285662 A1* | 12/2006 | Yin et al. .................... 379/88.16 |
| 2008/0317000 A1* | 12/2008 | Jackson ........................ 370/352 |

* cited by examiner

*Primary Examiner* — Melanie Jagannathan
*Assistant Examiner* — Najeebuddin Ansari (57) ABSTRACT

A system is disclosed. The system has a client device, an interactive response system, and an Internet Protocol (IP) network enabling IP communication between the client device and the interactive response system. The client device may be configured to place a call to the interactive response system via the IP network, to establish an IP telephonic communication session between the client device and the interactive response system, and to display textual content received from the interactive response system during the IP telephonic communication session. The interactive response system is configured to receive the call from the IP network, to establish the IP telephonic communication session between the client device and the interactive response system, to transmit textual content to the client device during the IP telephonic communication session.

27 Claims, 4 Drawing Sheets

CONVEYING TEXTUAL CONTENT FROM INTERACTIVE SYSTEMS TO IP CLIENTS

BACKGROUND INFORMATION

Interactive voice response (IVR) systems allow computer systems to interact with humans during telephone calls. Specifically, IVR systems detect voice and touch-tone input from the caller and respond with pre-recorded or dynamically-generated audio menus to further direct the call (e.g., call forwarding).

IVR systems are generally used by enterprises in virtually every type of industry to provide customer service via the telephone, e.g., credit card companies, consumer product companies, law offices, government agencies, etc. IVR systems are useful because of their ability to handle large call volumes, direct calls to appropriate extensions, and perform tasks that do not require human interaction (e.g., to make a payment over the phone). As such, IVR systems can save costs by reducing the need for personnel to handle calls.

Although IVR systems are useful in this regard, they fall short for a variety of reasons. For example, a caller is required to listen to each available menu choice before making a selection. This can be very frustrating, especially when the audio messages are long, numerous, and/or delivered slowly. In addition, those who are hearing-impaired cannot use IVR systems.

The present disclosure is directed to overcoming one or more of the problems associated with existing IVR systems.

DETAILED DESCRIPTION OF PREFERRED EMBODIMENTS

Reference will now be made in detail to the exemplary preferred embodiments implemented according to the disclosure, the examples of which are illustrated in the accompanying drawings. Wherever possible, the same reference numbers will be used throughout the drawings to refer to the same or like parts.

Exemplary embodiments may include a system including a client device, an interactive response system, and an Internet Protocol (IP) network enabling IP communication between the client device and the interactive response system. The client device may be configured to place a call to the interactive response system via the IP network, to establish an IP telephonic communication session between the client device and the interactive response system, and to display textual content received from the interactive response system during the IP telephonic communication session. The interactive response system may be configured to receive the call from the IP network, to establish the IP telephonic communication session between the client device and the interactive response system, and to transmit textual content to the client device during the IP telephonic communication session.

Exemplary embodiments may further include a method including placing, by a client device, a call via an Internet Protocol (IP) network; receiving, by an interactive response system, the call from the IP network; establishing an IP telephonic communication session between the client device and the interactive response system; transmitting textual content from the interactive response system to the client device during the IP telephonic communication session; and displaying, by the client device, the textual content.

Exemplary embodiments may further include an interactive response system configured to establish, responsive to a call received from a client device, an Internet Protocol (IP) telephonic communication session between the client device and the interactive response system via an IP network. The interactive response system may be further configured to transmit textual content to the client device via the IP network during the IP telephonic communication session.

Exemplary embodiments may further include a computer-readable medium having stored thereon a computer program which, when executed by an interactive response system, causes the interactive response system to perform a method. The method may include establishing, responsive to a call received from a client device, an Internet Protocol (IP) telephonic communication session between the client device and the interactive response system via an IP network. The method may further include transmitting textual content to the client device via the IP network during the IP telephonic communication session.

Exemplary embodiments may further include a system having an interactive response system and an Internet Protocol (IP) network enabling IP communication between the interactive response system and client devices. The interactive response system may be configured to receive a call from a client device via the IP network, establish an IP telephonic communication session between the client device and the interactive response system, and transmit textual content to the client device during the IP telephonic communication session.

Figure 1:
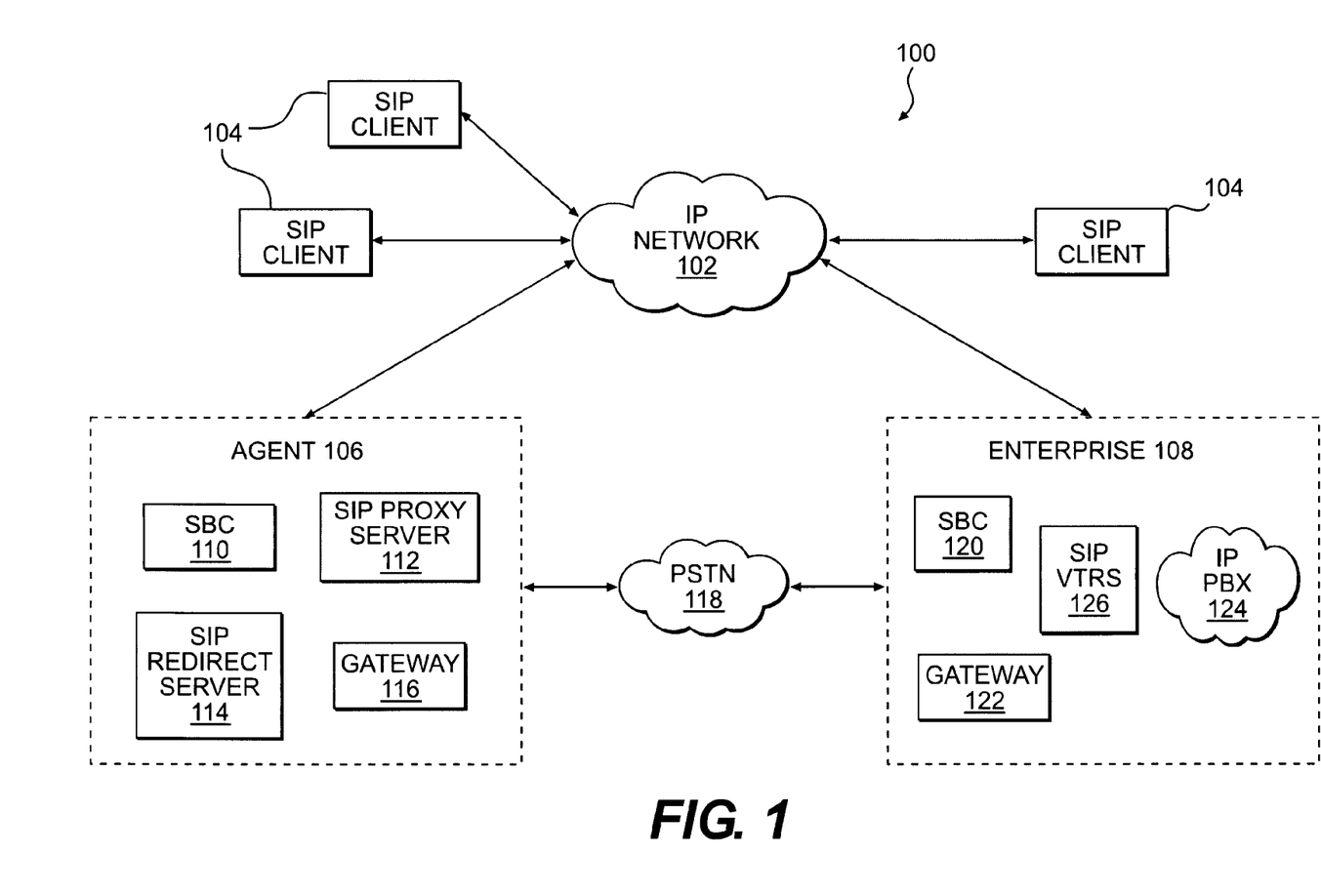
FIG. 1 is a representation of an exemplary Internet Protocol (IP) telephony environment.

FIG. 1 shows an exemplary Internet Protocol (IP) telephony environment 100. Environment 100 may be any system that facilitates IP telephonic communications or other IP communication services among a variety of systems and devices using one or more Internet protocols. Although the present disclosure is described with respect to Session Initiation Protocol (SIP), one of ordinary skill in the art will appreciate that the disclosure could also be implemented using other Voice over IP (VoIP) protocols, e.g., H.323 or other packet-signaling VoIP telephony protocols known in the art. Environment 100 may include one or more SIP client devices 104, an agent 106, and an enterprise 108 in communication via an IP network 102 (e.g., a TCP/IP network).

SIP client 104 may be any wired or wireless device configured to establish a SIP communication session and to exchange data over IP network 102 during the session (e.g., a VoIP telephone call). SIP client 104 may be configured to process voice, data, and/or Dual Tone Modulation Frequency (DTMF) transmissions. For instance, SIP client 104 may be a SIP IP phone, a land- or satellite-based SIP-enabled cellular telephone, or another device that allows a user to make voice-over-IP (VoIP) telephonic transmissions. SIP client 104 may alternatively embody a computer having suitable communication software (e.g., a graphical user interface tool) and peripheral devices attached thereto (e.g., a microphone, a speaker, and a keyboard).

Agent 106 may represent any computer system network entity that provides network services for SIP clients 104. For instance, agent 106 may represent a service provider that facilitates the establishment of calls between SIP clients 104 and/or the exchange of information between SIP clients 104 and enterprise 108. That is, agent 106 may include any devices and/or functionality required to establish ("nail up") a session between one or more SIP clients 104 and or enterprise 108. For instance, agent 106 may comprise a system of one or more networked computers having any suitable combination of processors; computer-readable storage devices, such as RAM and/or ROM memories, magnetic storage drives, etc.; input/output devices, such as displays, keyboards, a mouse, and other such input/output devices; and network infrastructure, etc. As shown by FIG. 1, agent 106 may include, among other things, a session border controller (SBC) 110, a SIP proxy server 112, a SIP redirect server 114, and a Gateway 116.

SBC 110 may be a session-aware device that acts as an interface between IP network 102 and agent 106. SBC 110 may perform a host of call-control functions. For instance, SBC 110 may monitor IP network 102 for calls that require access to agent 106 and regulate the type of calls that can gain access thereto (e.g., only calls from customers of a particular service provider). SBC 110 may convert the protocol of call signals entering or exiting agent 106 to another VoIP protocol (e.g., H.323 to SIP or vice versa) and/or perform firewall functions to ensure the privacy of calls utilizing agent 106.

SIP proxy server 112 may be any system that receives and processes SIP messages from SIP devices and forwards the messages on their behalf (e.g., tunneling). For instance, SIP proxy server 112 may receive and process messages received from SIP clients 104 and/or enterprise 108 via IP network 102 and forward the messages to another SIP client 104 and/or enterprise 108 via IP network 102. SIP proxy server 112 may be configured to create, signal, receive, process, and/or forward SIP messages such as, for example, INVITE( ), TRYING( ), ACK( ), OK( ), MOVED( ) TEMPORARILY( ), BYE( ), MESSAGE( ), REFER( ) and/or other SIP requests and messages known in the art and defined by Internet standards such as, for example, RFC 3515, 3261, etc.

For instance, the INVITE( ) request may invite a SIP device to join a session (i.e., a call). The TRYING( ) message may indicate to a SIP device that its request is being processed by another SIP device. The OK( ) message may indicate to a SIP device that its request has been processed by another SIP device. The ACK( ) message may indicate to the processing SIP device that the requesting SIP device has acknowledged the completion of processing of the request, which improves reliability of message exchanges. The MOVED TEMPORARILY( ) message may indicate to a SIP device (e.g., SIP proxy server 112) that it should forward a SIP message received from one SIP device (e.g., SIP client 104) to another SIP device (e.g., enterprise 108). The BYE( ) message may indicate to a SIP device that the current session should be terminated. MESSAGE( ) may contain textual characters to be displayed on a screen of the SIP device. REFER( ) may be used to transfer a call session from one SIP device to another SIP device. It is to be appreciated that any other SIP messages or requests may be utilized to facilitate communications in environment 100.

SIP redirect server 114 may be any system configured to provide address and/or other location information about destinations of devices on IP network 102. For example, SIP redirect server 114 may have a database indexing associated uniform resource locators (URL), uniform resource identifiers (URI), IP addresses, and/or telephone numbers for at least some of the destinations on IP network 102 and/or PSTN 118. SIP proxy server 112 may leverage SIP redirect server 114 to determine the next network node ("hop") to which a message should be forwarded or a response directed, etc. In this manner, the information from SIP redirect server 114 may be used to enable direct communication between SIP devices within environment 100 during a session.

Gateway 116 may be any device configured to interface between a SIP VoIP network and a non-VoIP network, such as a public switched telephone network (PSTN) 118. PSTN 118 may provide for communication with telephonic devices (e.g., traditional voice telephones, facsimile machines, etc.). Gateway 116 may convert packet-based SIP signals to corresponding signals having a format appropriate for PSTN 118, e.g., signaling system 7 ("SS7" or "C7") or another suitable PSTN protocol, and vice-versa. If SIP proxy server 112 determines, based on destination information retrieved from SIP redirect server 114, that the destination of a message lies in PSTN network 118 (i.e., outside IP network 102), SIP proxy server 112 may send the message to Gateway 116 for conversion and admission to PSTN 118. Likewise, signals originating from the traditional telephonic device on PSTN 118 may be converted by Gateway 116 from the PSTN protocol to SIP message packets, and routed by SIP protocol server 112 to the appropriate SIP device on IP network 102.

Enterprise 108 may represent the computer system of an enterprise that provides telephonic customer service functionality to its customers, such as, for example, a bank, a utility company, a government agency (e.g., the department of motor vehicles), a credit card company, a consumer electronics company, etc. Enterprise 108 may comprise a system of one or more networked computers having any suitable combination of processors; computer-readable storage devices, such as RAM and/or ROM memories, magnetic storage drives, etc.; input/output devices, such as displays, keyboards, a mouse, and other such input/output devices; and network infrastructure, etc. Enterprise 108 may include a session border controller (SBC) 120, a gateway 122, a IP private branch exchange (PBX) network 124, and a SIP interactive voice and textual response system (VTRS) 126, among other things.

SBC 120 and gateway 122 may have structure and functionality similar to that of SBC 110 and gateway 116, respectively, discussed above in connection with agent 106. That is, SBC 120 may serve as an interface between IP network 102 and Enterprise 108 by monitoring and/or regulating message traffic therebetween. Gateway 122 may convert messages between SIP and PSTN protocols to enable communication between SIP clients 104 and traditional telephonic devices (not shown) on PSTN 118.

PBX network 124 may be a private IP network located within enterprise 108 in which pooled trunk lines are shared by the telephone extensions within enterprise 108 (e.g., employee telephones). PBX network 124 may include a management server (not shown) that facilitates communications between extensions inside and outside of PBX 124 and provides a variety of features, such as call forwarding, voicemail, conference calling, etc.

Figure 2:
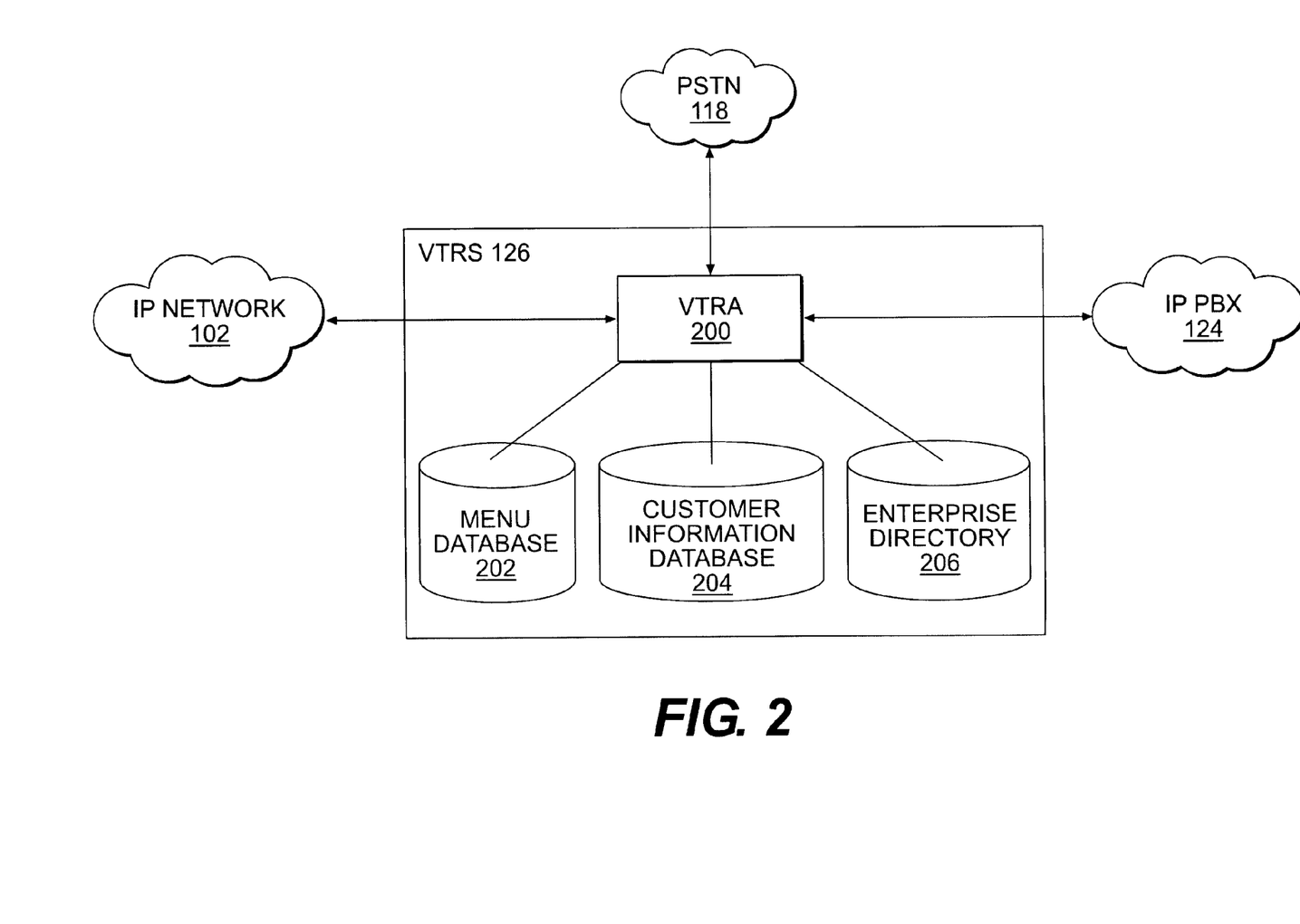
FIG. 2 is a representation of an exemplary disclosed interactive response system for use with the IP telephony environment of FIG. 1.

Referring to FIG. 2, VTRS 126 may be any system that receives and processes SIP messages from SIP clients 104 and/or messages forwarded by SIP proxy server 112 on behalf of SIP clients 104 (i.e., an interactive response server). VTRS 126 may be configured to interact with, and receive information from, SIP clients 104 during call sessions. Specifically, VTRS 126 may present a series of voice and/or textual prompts to users of SIP clients 104 during a session. VTRS 126 may, in turn, respond to voice input, touch-tone signals, and/or other types of input messages received from SIP clients 104. The responses may take the form of, for example, further voice and/or textual menus, voice and/or textual requests for information from the user of SIP client 104 (e.g., customer account information), and/or other types of interactive responses. VTRS 126 may include a voice and textual response application (VTRA) 200, a menu database 202, a customer information database 204, and an enterprise directory 206. It is to be appreciated, however, that VTRS 126 may include additional, fewer, and/or different elements than those shown in FIG. 2 and described herein, if desired.

Menu database 202 may contain predetermined menus stored in the form of audio and text. In a case where the enterprise is a credit card company, for example, a given menu may read, "To check your account balance, press 1. To make a payment, press 2. To report a lost or stolen card, press 3. To enroll in electronic bill pay, press 4. To speak to a customer service representative, press 0." As such, menu database 202 may contain an audio entry (e.g., a WAV file, an mp3 file, or another audio file) for each menu.

The audio entries may include or otherwise be associated with information that allows VTRA 200 to select and present the menus to a user of SIP client 104 in proper sequence. For instance, the audio entries may be labeled or otherwise indexed to allow VTRA 200 to identify and select the menus for presentation based on the user's input to SIP client 104. Further, the audio entries may include or otherwise be associated with information indicating subsequent menus to be communicated to SIP client 104 and/or actions to be taken, based on the user's input.

In addition, menu database 202 may contain one or more textual entries for each menu choice. Like the audio entries, the textual entries may contain or otherwise be associated with information that enables VTRA 200 to select and present the menu selections to a user of SIP client 104 in proper sequence. For example, a textual entry for a given menu choice may have the form of <MenuID, Text, Key, Next>, where MenuID identifies the particular menu to which the menu choice belongs; Text is the actual textual content of the menu selection (e.g., "To speak to a customer service representative, press 0"; Key identifies the particular key(s) that trigger selection of the menu choice (e.g., "0"); and Next specifies the next action that will be taken should the user select the particular menu choice. For instance, Next may point to, or otherwise identify, a subsequent menu (i.e., a MenuID) to be provided to the user; an internal enterprise extension or outside phone number for call forwarding; a software script to be executed by VTRA 200 (e.g., checking a credit card balance, making a payment over the phone, etc.); and/or other suitable actions.

Customer information database 204 may contain information about customers of enterprise 108 (e.g., customer accounts). Continuing with the above example in which enterprise 108 represents a credit card company, customer information database 204 may contain names, addresses, account numbers, balances, statements, payment histories, etc., for customers of the enterprise. It is to be appreciated, however, that the content of customer information database 204 may vary depending upon the nature of the particular enterprise. VTRA 200 may access the information contained in customer information database 204 during a session to facilitate various tasks (e.g., to check a balance or to make a payment over the phone).

Enterprise directory 206 may contain information about telephone extensions within the enterprise. For instance, enterprise directory 206 may contain a list of telephone extensions within the network indexed to employee names, divisions, departments, positions, office location, etc. VTRA 200 may access the information contained in enterprise directory 206 during a session to facilitate various tasks (e.g., to allow a user of SIP client 104 to search for a particular employee using the first three letters of the employee's last name). VTRA 200 may also retrieve telephone extensions from enterprise directory 206 for call forwarding purposes.

VTRA 200 may be a software application responsible for responding to messages received from SIP clients 104 and/or messages forward by SIP proxy server 112 on behalf of SIP clients 104 during a session. VTRA 200 may use menu database 202, customer information database 204, enterprise directory 206, IP network 102, PBX network 124, and PSTN 118 (via gateway 122) to provide services to users of SIP clients 104. For instance, VTRA 200 may execute one or more software modules, scripts, etc., to provide SIP services to SIP clients 104. These services may include, among other things, textual display of interactive menus on SIP clients 104, which will be further discussed below; interactive voice response menus; call forwarding to other SIP clients 104 on IP network 102, to IP telephone extensions on PBX network 124, or to traditional telephonic devices on PSTN 118; services particular to the enterprise, such as checking a balance or making a payment over the phone; and/or other services.

Figure 3:
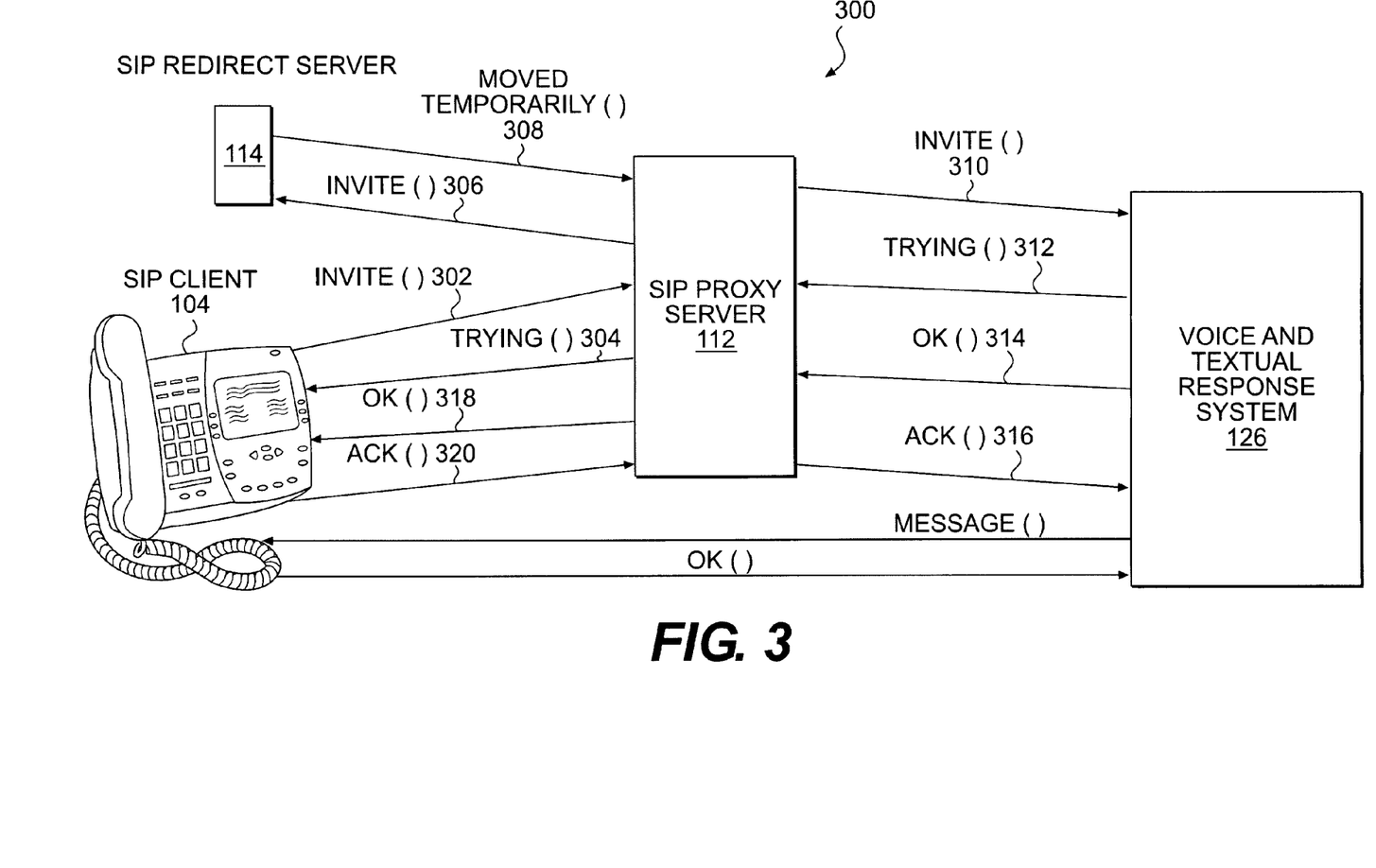
FIG. 3 shows an exemplary disclosed call flow diagram for the IP telephony environment of FIG. 1.

FIG. 3 shows an exemplary call flow diagram 300 for environment 100. First, a user of SIP client 104 may make a telephone call. For instance, the user may dial the phone number (e.g., 800-123-4567) for enterprise 108 (e.g., XYZ Bank). As shown in FIG. 3, a call request for, or a request to establish a SIP session with, enterprise 108 is sent by SIP client 104 over IP network 102 (step 302). In particular, SIP client 104 may generate and send an INVITE( ) message having a destination address identifying enterprise 108 (e.g., 8001234567@ABCServiceProvider.com). The INVITE( ) message may include an indication that exchange of textual content (i.e., SIP MESSAGE( ) transmissions) is to be allowed during the session, among other things. For example, the body of the INVITE( ) message may contain a header listing the types of messages that are allowed during the session (e.g., Allow: ACK( ), BYE( ), CANCEL( ), INVITE( ), MESSAGE( ), OPTIONS( ), INFO( ), SUBSCRIBE( ), REFER( ), NOTIFY( ), PRACK( ), etc.).

SIP proxy server 112 may receive the INVITE( ) message from IP network 102 and send a message to SIP client 104 indicating that the INVITE( ) message is being processed (step 304). For instance, SIP proxy server 112 may return a TRYING( ) message to SIP client 104. SIP proxy server 112 may also forward the INVITE( ) message to SIP redirect server 114 (step 306).

SIP redirect server 114 may determine, based on the destination address contained in the INVITE( ) message (i.e., 8001234567@ABCServiceProvider.com), the next network node, or "hop," to which the INVITE( ) message should be forwarded. For example, SIP redirect server 114 may look up the phone number "800-123-4567" in a dynamically-updated database (not shown) and retrieve therefrom the address for enterprise 108 on IP network 102 (e.g., a URI, a URL, an IP address, etc.). SIP redirect server 114 may then send to SIP proxy server 112 a MOVED TEMPORARILY( ) message containing, among other things, the address of enterprise 108 on IP network 102 (step 308). It is to be appreciated that, depending on the size and complexity of IP network 102, environment 100 may include multiple SIP proxy servers 112 and/or multiple SIP redirect servers 114. As such, the INVITE( ) message may have to be passed to, and forwarded by, multiple intermediate nodes before reaching its destination (enterprise 108). For purposes of illustrating the disclosure, however, only one SIP proxy server 112 and one SIP redirect server are shown.

Upon receiving the MOVED TEMPORARILY( ) message, SIP proxy server may forward the INVITE( ) message to the IP network address of enterprise 108, where may be received by VTRS 126 (step 310). VTRS 126 may, in turn, send a TRYING( ) message or a RINGING( ) message to SIP proxy server 112 to indicate to SIP proxy server 112 that VTRS 126 is processing the INVITE( ) request (step 312).

Once this processing is completed (i.e., VTRS 126 "answers" the call), VTRS 126 may send an OK( ) message to SIP proxy server 112 to indicate that processing of the INVITE( ) message is complete (step 314). SIP proxy server 112 may then send an ACK( ) message to VTRS 126 to acknowledge completion of the processing (step 316), i.e., that VTRS 126 has "answered" the call. SIP proxy server 112 may also send an OK( ) message to SIP client 104 to indicate to SIP client 104 that processing of its INVITE( ) request has been completed (step 318). SIP client 104 may also acknowledge the processing of the INVITE( ) request (step 320).

At this point, a SIP session between SIP client and VTRS 126 is established (i.e., SIP client 104 is "nailed up"). SIP client 104 may now be free to interact with VTRS 126. That is, VTRS 126 may now interactively transmit voice and/or textual content (e.g., menus) to, and process input commands from, SIP client 104.

Figure 4:
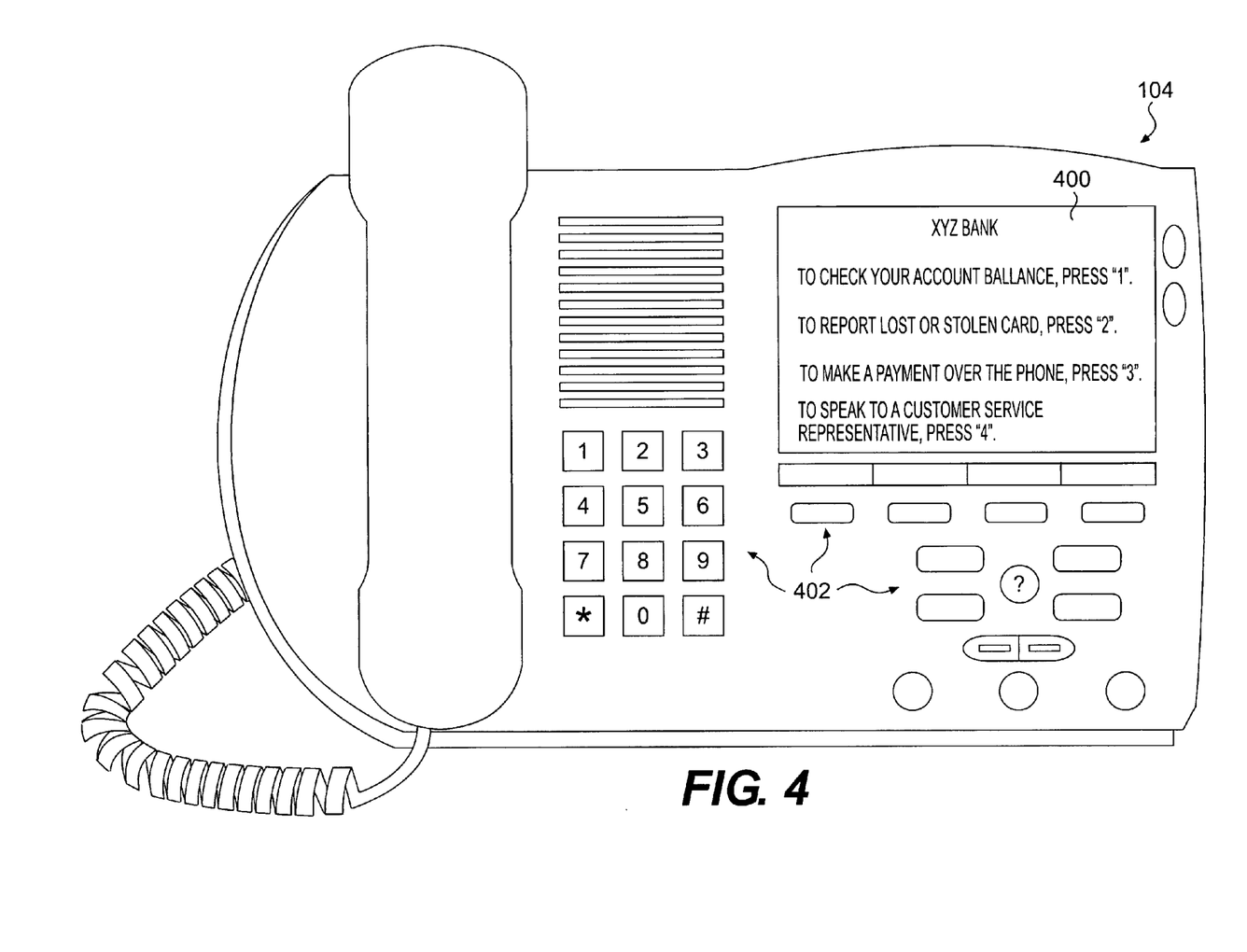
FIG. 4 shows an exemplary client for use with the IP telephony environment of FIG. 1.

FIG. 4 shows an exemplary SIP client 104 after a session with VTRS 126 is established. Although FIG. 4 shows SIP client 104 as being an IP phone having a base and a handset, as discussed above, SIP client 104 could be an IP cellular phone, a PC software IP telephone utilizing peripheral input/output devices and/or a GUI, or any other SIP device known in the art. The exemplary SIP client 104 shown in FIG. 4 is intended to be illustrative in nature and not limiting. SIP client 104 may include a display 400 (e.g., an LCD, a monitor, a GUI, etc.) and input devices 402 (e.g., hardware or software buttons, dials, knobs, etc.).

VTRS 126 may send textual content to SIP client 104 containing menu selections for the user. For instance, VTRA 200 may send to SIP client 104 a SIP MESSAGE( ) communication containing the menu selections to be provided to the user. The textual content of the menu may be specified, for example, in a content header contained in the body of the MESSAGE( ) communication. The textual content of the menu may read "XYZ Bank. To check your account balance, press '1' To report a lost or stolen card, press '2.' To make a payment over the phone, press '3.' To speak to a customer serve representative, press '4.'" Upon receiving the MESSAGE( ) communication, SIP client 104 may show the textual content of the menu on display 400, as shown in FIG. 4. The user may thus read through the available choices and quickly identify an appropriate selection without waiting for an audio message to complete.

The user of SIP client 104 may interact with VTRS 126 by inputting menu selection commands to SIP client 104. For instance, the user may choose a desired menu selection by pressing one of buttons "1" through "4." In response, SIP client 104 may communicate a corresponding DTMF signal to VTRS 126. In a case where VTRS 126 is equipped with voice recognition software, the user may alternatively or additionally speak the user's menu choice into SIP client 104. SIP client 104 may thus communicate a corresponding vocal signal transmission to VTRS 126, which may, in turn, process the vocal signal transmissions to determine the user's selection.

Upon receiving and/or determining the user's selection, VTRS 126 may immediately determine and take an appropriate action based on the selection signal. VTRS 126 may send another menu, i.e., transmit a MESSAGE( ) containing the textual content of the menu, as discussed above, execute a script or module, forward the call, etc.

In one example, if the user's selection is "1" (i.e., to check an account balance), VTRS 126 may execute a module or script that accesses and provides the account balance to the user. VTRS 126 may, for example, generate and send to SIP client 104 one or more MESSAGE( ) communications asking the user to enter the user's account number, social security number, etc., in order to gather information required to access the user's account in a secure fashion. The textual content of the MESSAGE( ) communications may similarly be shown on the display of SIP client 104. For example, SIP client 104 may display a sequence of instructions such as: "please enter your account number followed by the # sign," and "please enter your social security number followed by the # sign." The user may use input devices 402 and/or voice to respond to the instructions, and SIP client 104 may communicate corresponding DTMF and/or vocal signals to VTRS 126 indicative of the user's responses. VTRS 126 may then check the user's responses against account information for the user contained in customer information database 204 for verification. If the user's responses are verified, VTRS 126 may communicate a MESSAGE( ) communication to SIP client 104 containing the user's account balance. For example, "your account balance is $1.67" may be shown on display 400.

In another example, if the user's selection is "4" (i.e., to speak to a customer service representative), VTRS 126 may leverage menu database 202 and/or enterprise directory 206 to determine an appropriate telephone number, extension within the enterprise (i.e., on PBX 124), etc., to which the call is to be forwarded. If VTRS 126 determines that the call should be forwarded to an extension on PBX 124 or IP network 102, for example, VTRS 126 may establish a session by sending a REFER( ) message to the address of the appropriate client on PBX 126 or SIP client on IP network 102, respectively. If VTRS 126 determines that the call should be forwarded to a telephone number on PSTN 118, VTRS 126 may forward call to the appropriate telephone number on PSTN 118 using gateway 122.

The disclosed environment 100 may improve the scope, usage, and helpfulness of interactive response systems. In particular, because the disclosed interactive response system sends menus to the client as textual content, the menus may be displayed on the IP client's screen. As such, the caller (i.e., the user of client 104) is not required to listen to seemingly interminable audio menus in order to identify an appropriate selection. Instead, the caller may quickly read the menu provided on the display of the IP client and make an appropriate selection. In this fashion, the caller may navigate through the menus to reach the desired extension and/or access the desired information as quickly as possible. In addition, the disclosed environment 100 may provide benefits for the hearing-impaired, who cannot use traditional interactive voice response systems.

Those skilled in the art will appreciate that all or part of systems and methods consistent with the present disclosure may be stored on or read from other computer-readable media. Environment 100 may include a computer-readable medium having stored thereon machine executable instructions for performing, among other things, the methods disclosed herein. Exemplary computer readable media may include secondary storage devices, like hard disks, floppy disks, and CD-ROM; or other forms of computer-readable memory, such as read-only memory (ROM) or random-access memory (RAM). Such computer-readable media may be included by or embodied in one or more components of environment 100, such as IP network 102, SIP clients 104, agent 106, and enterprise 108, and/or combinations of these and other components.

Furthermore, one skilled in the art will also realize that the processes illustrated in this description may be implemented in a variety of ways and include other modules, programs, applications, scripts, processes, threads, or code sections that may all functionally interrelate with each other to provide the functionality described above for each module, script, and daemon. For example, these programs modules may be implemented using commercially available software tools, using custom object-oriented code written in the C++ programming language, using applets or scripts written in the Java programming language, or may be implemented with discrete electrical components or as one or more hardwired application specific integrated circuits (ASIC) that are custom designed for this purpose.

Other embodiments may be apparent to those skilled in the art from consideration and practice of the disclosure. It is intended that the specification and examples be considered as exemplary only, with a true scope and spirit of the disclosure being indicated by the following claims.

We claim:

1. A system, comprising:
   a client device;
   an interactive response system; and
   an Internet Protocol (IP) network enabling IP communication between the client device and the interactive response system,
   wherein the client device is configured to:
     place a call to the interactive response system via the IP network,
     establish an IP telephonic communication session between the client device and the interactive response system, and
     display textual content received from the interactive response system during the IP telephonic communication session, and
   the interactive response system is configured to:
     receive the call from the IP network,
     establish the IP telephonic communication session between the client device and the interactive response system,
     generate a Session Initiation Protocol (SIP) MESSAGE( ) communication containing the textual content, the textual content including one or more interactive menu choices,
     transmit the SIP MESSAGE( ) communication containing the textual content including one or more interactive menu choices to the client device during the call and over the IP telephonic communication session, wherein the SIP MESSAGE( ) communication is sent from the interactive response system to the client device immediately after (a) the client device generates and sends an INVITE( ) message having an address identifying an enterprise that contains the interactive response system, (b) a SIP proxy server receives the INVITE( ) message, sends a message to the client device indicating that the INVITE( ) message is being processed, and also forwards the INVITE( ) message to an SIP redirect server, (c) the SIP redirect server, after receiving the INVITE( ) message, sends to the SIP proxy server a MOVED TEMPORARILY( ) message containing, among other thing, the address of the enterprise that contains the interactive response system, (d) the SIP proxy server, after receiving the MOVED TEMPO-RARILY( ) message, forwards the INVITE( ) message to the address of the enterprise that contains the interactive response system, (e) the interactive response system, after receiving the INVITE( ) message, sends a TRYING( ) message or a RINGING( ) message to the SIP proxy server to indicate to the SIP proxy server that the interactive response system is processing the INVITE( ) message, (f) the interactive response system, after the processing is completed, sends an OK( ) message to the SIP proxy server to indicate that processing of the INVITE( ) message is complete, (g) the SIP proxy server, after receiving the OK( ) message, sends an ACK( ) message to the interactive response system to acknowledge completion of the processing, (h) the SIP proxy server, also after receiving the OK( ) message, sends another OK( ) message to the client device to indicate to the client device that processing of the INVITE( ) message has been completed, and (i) the client device, after receiving the other OK( ) message, sends another ACK( ) message to the SIP proxy server acknowledging the processing of the INVITE( ) message, and
     process the user response to the textual content without waiting for completion of play of the corresponding audio content,
   wherein the textual content including one or more interactive menu choices is specified in a content header contained in a body of the SIP MESSAGE( ) communication.

2. The system of claim 1, wherein the textual content comprises at least one interactive menu choice to be displayed for selection.

3. The system of claim 2, wherein the interactive response system is further configured to:
   receive commands sent from the client device in response to input from a user; and
   respond to the commands.

4. The system of claim 3, wherein responding to the commands includes at least one of:
   transmitting further textual content to the client device,
   transmitting to the client device at least one textual content request for information from the user, and
   forwarding the IP telephonic communication session to another client device.

5. The system of claim 3, wherein the commands comprise at least one of Dual Tone Modulation Frequency (DTMF) signal transmissions and vocal signal transmissions.

6. The system of claim 1, wherein:
   establishing the IP telephonic communication session includes sending a Session Initiation Protocol (SIP) INVITE message from the client device to the interactive response system via the IP network, and
   the SIP INVITE message indicates that the exchange of textual content is to be allowed during the IP telephonic communication session.

7. A method, comprising:
   placing, by a client device, a call via an Internet Protocol (IP) network;
   receiving, by an interactive response system, the call from the IP network;
   establishing an IP telephonic communication session between the client device and the interactive response system;
   generating a Session Initiation Protocol (SIP) MESSAGE( ) communication containing textual content, the textual content including one or more interactive menu choices;

transmitting the SIP MESSAGE( ) communication containing the textual content including one or more interactive menu choices from the interactive response system to the client device during the call and over the IP telephonic communication session, wherein the SIP MESSAGE( ) communication is sent from the interactive response system to the client device immediately after (a) the client device generates and sends an INVITE( ) message having an address identifying an enterprise that contains the interactive response system, (b) a SIP proxy server receives the INVITE( ) message, sends a message to the client device indicating that the INVITE( ) message is being processed, and also forwards the INVITE( ) message to an SIP redirect server, (c) the SIP redirect server, after receiving the INVITE( ) message, sends to the SIP proxy server a MOVED TEMPORARILY( ) message containing, among other things, the address of the enterprise that contains the interactive response system, (d) the SIP proxy server, after receiving the MOVED TEMPORARILY( ) message, forwards the INVITE( ) message to the address of the enterprise that contains the interactive response system, (e) the interactive response system, after receiving the INVITE( ) message, sends a TRYING( ) message or a RINGING( ) message to the SIP proxy server to indicate to the SIP proxy server that the interactive response system is processing the INVITE( ) message, (f) the interactive response system, after the processing is completed, sends an OK( ) message to the SIP proxy server to indicate that processing of the INVITE( ) message is complete, (g) the SIP proxy server, after receiving the OK( ) message, sends an ACK( ) message to the interactive response system to acknowledge completion of the processing, (h) the SIP proxy server, also after receiving the OK( ) message, sends another OK( ) message to the client device to indicate to the client device that processing of the INVITE( ) message has been completed, and (i) the client device, after receiving the other OK( ) message, sends another ACK( ) message to the SIP proxy server acknowledging the processing of the INVITE( ) message; and displaying, by the client device, the textual content, wherein the textual content including one or more interactive menu choices is specified in a content header contained in a body of the SIP MESSAGE( ) communication.

8. The method of claim 7, wherein the textual content comprises at least one interactive menu choice to be displayed for selection.

9. The method of claim 8, further including:

receiving, by the interactive response system, commands sent from the client device in response to input from a user; and responding, by the interactive response system, to the commands.

10. The method of claim 9, wherein responding to the commands includes at least one of:

transmitting, from the interactive response system to the client device, further textual content;

transmitting, from the interactive response system to the client device, at least one textual content request for information from the user; and forwarding, by the interactive response system, the IP telephonic communication session to another client device.

11. The method of claim 9, wherein the commands comprise at least one of Dual Tone Modulation Frequency (DTMF) signal transmissions and vocal signal transmissions.

12. The method of claim 7, wherein:

establishing the IP telephonic communication session includes sending a Session Initiation Protocol (SIP) INVITE message from the client device to the interactive response system via the IP network, and the SIP INVITE message indicates that the exchange of textual content is to be allowed during the IP telephonic communication session.

13. An interactive response system configured to:

establish, responsive to a call received from a client device, an Internet Protocol (IP) telephonic communication session between the client device and the interactive response system via an IP network;

generate a Session Initiation Protocol (SIP) MESSAGE( ) communication containing textual content, the textual content including one or more interactive menu choices; and transmit the SIP MESSAGE( ) communication containing the textual content including one or more interactive menu choices to the client device via the IP network during the call and over the IP telephonic communication session, wherein the SIP MESSAGE( ) communication is sent from the interactive response system to the client device immediately after (a) the client device generates and sends an INVITE( ) message having an address identifying an enterprise that contains the interactive response system, (b) a SIP proxy server receives the INVITE( ) message, sends a message to the client device indicating that the INVITE( ) message is being processed, and also forwards the INVITE( ) message to an SIP redirect server, (c) the SIP redirect server, after receiving the INVITE( ) message, sends to the SIP proxy server a MOVED TEMPORARILY( ) message containing, among other things, the address of the enterprise that contains the interactive response system, (d) the SIP proxy server, after receiving the MOVED TEMPORARILY( ) message, forwards the INVITE( ) message to the address of the enterprise that contains the interactive response system, (e) the interactive response system, after receiving the INVITE( ) message, sends a TRYING( ) message or a RINGING( ) message to the SIP proxy server to indicate to the SIP proxy server that the interactive response system is processing the INVITE( ) message, (f) the interactive response system, after the processing is completed, sends an OK( ) message to the SIP proxy server to indicate that processing of the INVITE( ) message is complete, (g) the SIP proxy server, after receiving the OK( ) message, sends an ACK( ) message to the interactive response system to acknowledge completion of the processing, (h) the SIP proxy server, also after receiving the OK( ) message, sends another OK( ) message to the client device to indicate to the client device that processing of the INVITE( ) message has been completed, and (i) the client device, after receiving the other OK( ) message, sends another ACK( ) message to the SIP proxy server acknowledging the processing of the INVITE( ) message, wherein the textual content including one or more interactive menu choices is specified in a content header contained in a body of the SIP MESSAGE( ) communication.

14. The interactive response system of claim 13, wherein the textual content comprises at least one interactive menu choice to be displayed for selection.

15. The interactive response system of claim 14, further configured to:

receive commands sent from the client device in response to input from a user; and
respond to the commands.

16. The interactive response system of claim 15, wherein responding to the commands includes at least one of:
transmitting further textual content to the client device,
transmitting to the client device at least one textual content request for information from the user, and
forwarding the IP telephonic communication session to another client device.

17. The interactive response system of claim 15, wherein the commands comprise at least one of Dual Tone Modulation Frequency (DTMF) signal transmissions and vocal signal transmissions.

18. The interactive response system of claim 13, wherein:
establishing the IP telephonic communication session includes receiving from the client device via the IP network a Session Initiation Protocol (SIP) INVITE message, and
the SIP INVITE message indicates that the exchange of textual content is to be allowed during the IP telephonic communication session.

19. The interactive response system of claim 13, wherein establishing an IP telephonic communication session includes receiving a SIP INVITE( ) message that includes:
a destination address associated with the interactive response system; and
indications of types of SIP communications permitted to be exchanged during the call, the indications including at least an indication that SIP MESSAGE( ) communications for exchanging textual content are permitted to be exchanged during the call.

20. A non-transitory computer-readable medium having stored thereon a computer program which, when executed by an interactive response system, causes the interactive response system to perform a method, the method comprising:
establishing, responsive to a call received from a client device, an Internet Protocol (IP) telephonic communication session between the client device and the interactive response system via an IP network;
generating a Session Initiation Protocol (SIP) MESSAGE( ) communication containing textual content, the textual content including one or more interactive menu choices; and
transmitting the SIP MESSAGE( ) communication containing the textual content including one or more interactive menu choices to the client device via the IP network during the call and over the IP telephonic communication session, wherein the SIP MESSAGE( ) communication is sent from the interactive response system to the client device immediately after (a) the client device generates and sends an INVITE( ) message having an address identifying an enterprise that contains the interactive response system, (b) a SIP proxy server receives the INVITE( ) message, sends a message to the client device indicating that the INVITE( ) message is being processed, and also forwards the INVITE( ) message to an SIP redirect server, (c) the SIP redirect server, after receiving the INVITE( ) message, sends to the SIP proxy server a MOVED TEMPORARILY ( ) message containing, among other things, the address of the enterprise that contains the interactive response system, (d) the SIP proxy server, after receiving the MOVED TEMPORARILY( ) message, forwards the INVITE( ) message to the address of the enterprise that contains the interactive response system, (e) the interactive response system, after receiving the INVITE( ) message, sends a TRYING( ) message or a RINGING( ) message to the SIP proxy server to indicate to the SIP proxy server that the interactive response system is processing the INVITE( ) message, (f) the interactive response system, after the processing is completed, sends an OK( ) message to the SIP proxy server to indicate that processing of the INVITE( ) message is complete, (g) the SIP proxy server, after receiving the OK( ) message, sends an ACK( ) message to the interactive response system to acknowledge completion of the processing, (h) the SIP proxy server, also after receiving the OK( ) message, sends another OK( ) message to the client device to indicate to the client device that processing of the INVITE( ) message has been completed, and (i) the client device, after receiving the other OK( ) message, sends another ACK( ) message to the SIP proxy server acknowledging the processing of the INVITE( ) message,
wherein the textual content including one or more interactive menu choices is specified in a content header contained in a body of the SIP MESSAGE( ) communication.

21. The computer-readable medium of claim 20, wherein the textual content comprises at least one interactive menu choice to be displayed for selection.

22. The computer-readable medium of claim 21, wherein the method further includes:
receiving commands sent from the client device in response to input from a user; and
responding to the commands.

23. The computer-readable medium of claim 22, wherein responding to the commands includes at least one of:
transmitting further textual content to the client device,
transmitting to the client device at least one textual content request for information from the user, and
forwarding the IP telephonic communication session to another client device.

24. The computer-readable medium of claim 22, wherein the commands comprise at least one of Dual Tone Modulation Frequency (DTMF) signal transmissions and vocal signal transmissions.

25. The computer-readable medium of claim 20, wherein:
establishing the IP telephonic communication session includes receiving from the client device via the IP network a Session Initiation Protocol (SIP) INVITE message, and
the SIP INVITE message indicates that the exchange of textual content is to be allowed during the IP telephonic communication session.

26. A system, comprising:
an interactive response system; and
an Internet Protocol (IP) interface enabling network enabling IP communications over an IP network between the interactive response system and client devices,
wherein the interactive response system is configured to:
receive a call from a client device via the IP network,
establish an IP telephonic communication session between the client device and the interactive response system,
generate a Session Initiation Protocol (SIP) MESSAGE( ) communication containing textual content, the textual content including one or more interactive menu choices, and
transmit the SIP MESSAGE( ) communication containing the textual content including one or more interactive menu choices to the client device during the IP telephonic communication session, wherein the SIP MESSAGE( ) communication is sent from the interactive response system to the client device immediately after (a) the client device generates and sends an INVITE( ) message having an address identifying an enterprise that contains the interactive response system, (b) a SIP proxy server receives the INVITE( ) message, sends a message to the client device indicating that the INVITE( ) message is being processed, and also forwards the INVITE( ) message to an SIP redirect server, (c) the SIP redirect server, after receiving the INVITE( ) message, sends to the SIP proxy server a MOVED TEMPORARILY( ) message containing, among other things, the address of the enterprise that contains the interactive response system, (d) the SIP proxy server, after receiving the MOVED TEMPORARILY( ) message, forwards the INVITE( ) message to the address of the enterprise that contains the interactive response system, (e) the interactive response system, after receiving the INVITE( ) message, sends a TRYING( ) message or a RINGING( ) message to the SIP proxy server to indicate to the SIP proxy server that the interactive response system is processing the INVITE( ) message, (f) the interactive response system, after the processing is completed, sends an OK( ) message to the SIP proxy server to indicate that processing of the INVITE( ) message is complete, (g) the SIP proxy server, after receiving the OK( ) message, sends an ACK( ) message to the interactive response system to acknowledge completion of the processing, (h) the SIP proxy server, also after receiving the OK( ) message, sends another OK( ) message to the client device to indicate to the client device that processing of the INVITE( ) message has been completed, and (i) the client device, after receiving the other OK( ) message, sends another ACK( ) message to the SIP proxy server acknowledging the processing of the INVITE( ) message, wherein the textual content including one or more interactive menu choices is specified in a content header contained in a body of the SIP MESSAGE( ) communication.

27. A method, comprising:

receiving, from a client device, a call via an Internet Protocol (IP) network;

generating a Session Initiation Protocol (SIP) MESSAGE( ) communication containing one or more interactive menu choices in the body of the SIP MESSAGE( ) communication;

transmitting, to the client device during the call and over an established IP telephonic communication session between the client device and an interactive response system, both the SIP MESSAGE( ) communication containing the one or more interactive menu choices and audio content corresponding to the one or more interactive menu choices, wherein the SIP MESSAGE( ) communication is sent from the interactive response system to the client device immediately after (a) the client device generates and sends an INVITE( ) message having an address identifying an enterprise that contains the interactive response system, (b) a SIP proxy server receives the INVITE( ) message, sends a message to the client device indicating that the INVITE( ) message is being processed, and also forwards the INVITE( ) message to an SIP redirect server, (c) the SIP redirect server, after receiving the INVITE( ) message, sends to the SIP proxy server a MOVED TEMPORARILY( ) message containing, among other things, the address of the enterprise that contains the interactive response system, (d) the SIP proxy server, after receiving the MOVED TEMPORARILY( ) message, forwards the INVITE( ) message to the address of the enterprise that contains the interactive response system, (e) the interactive response system, after receiving the INVITE( ) message, sends a TRYING( ) message or a RINGING( ) message to the SIP proxy server to indicate to the SIP proxy server that the interactive response system is processing the INVITE( ) message, (f) the interactive response system, after the processing is completed, sends an OK( ) message to the SIP proxy server to indicate that processing of the INVITE( ) message is complete, (g) the SIP proxy server, after receiving the OK( ) message, sends an ACK( ) message to the interactive response system to acknowledge completion of the processing, (h) the SIP proxy server, also after receiving the OK( ) message, sends another OK( ) message to the client device to indicate to the client device that processing of the INVITE( ) message has been completed, and (i) the client device, after receiving the other OK( ) message, sends another ACK( ) message to the SIP proxy server acknowledging the processing of the INVITE( ) message;

receiving, from the client device, a response to the one or more interactive menu choices; and processing, by the interactive response system, the received response without waiting for completion of playing of the corresponding audio content at the client device, wherein the one or more interactive menu choices is specified in a content header in a body of the SIP MESSAGE( ) communication.

\* \* \* \* \*